United States Patent
Gaillet et al.

(10) Patent No.: US 11,112,762 B2
(45) Date of Patent: Sep. 7, 2021

(54) UNIVERSAL PROGRAMMING STATION WITH ORIENTABLE BLOCKS

(71) Applicant: ORANGE, Issy-les-Moulineaux (FR)

(72) Inventors: Thierry Gaillet, Chatillon (FR); Sylvain Leroux, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/954,395

(22) PCT Filed: Dec. 6, 2018

(86) PCT No.: PCT/FR2018/053126
§ 371 (c)(1),
(2) Date: Jun. 16, 2020

(87) PCT Pub. No.: WO2019/122570
PCT Pub. Date: Jun. 27, 2019

(65) Prior Publication Data
US 2021/0088990 A1    Mar. 25, 2021

(30) Foreign Application Priority Data
Dec. 18, 2017 (FR) ....................... 1762340

(51) Int. Cl.
*G05B 19/042* (2006.01)
*H04L 12/28* (2006.01)
(52) U.S. Cl.
CPC .......... *G05B 19/042* (2013.01); *H04L 12/282* (2013.01); *H04L 12/2818* (2013.01); *G05B 2219/23043* (2013.01)

(58) Field of Classification Search
CPC ........ G05B 19/042; G05B 2219/23043; H04L 12/2818; H04L 12/282; G08C 2201/21; G08C 2201/20; G08C 17/02
See application file for complete search history.

(56) References Cited

U.S. PATENT DOCUMENTS

2009/0066534 A1   3/2009  Sivakkolundhu
2010/0121968 A1   5/2010  Clark

OTHER PUBLICATIONS

International Search Report dated Jan. 10, 2019 for corresponding International Application No. PCT/FR2018/053126, filed Dec. 6, 2018.
Written Opinion of the International Searching Authority dated Jan. 10, 2019 for corresponding International Application No. PCT/FR2018/053126, filed Dec. 6, 2018.
English translation of the Written Opinion of the International Searching Authority dated Jan. 18, 2019 for corresponding International Application No. PCT/FR2018/053126, filed Dec. 6, 2018.

*Primary Examiner* — Tejal Gami
(74) *Attorney, Agent, or Firm* — David D. Brush; Westman, Champlin & Koehler, P.A.

(57) ABSTRACT

A universal programming station with orientable blocks includes several blocks that can have variable orientations on a support. The orientations of the blocks determine programming instructions applicable to various devices. Such a programming station is intuitive and can be used easily. Moreover, connecting the station with a management platform, via a communication network, promotes the universal character of same with respect to the devices to be programmed.

11 Claims, 7 Drawing Sheets

UNIVERSAL PROGRAMMING STATION WITH ORIENTABLE BLOCKS

CROSS-REFERENCE TO RELATED APPLICATIONS

This Application is a Section 371 National Stage Application of International Application No. PCT/FR2018/053126, filed Dec. 6, 2018, the content of which is incorporated herein by reference in its entirety, and published as WO 2019/122570 on Jun. 27, 2019, not in English.

TECHNICAL FIELD

The present invention relates to a universal programming station.

BACKGROUND

Individuals and businesses have an increasing need to control devices installed in various locations, such as living spaces or business spaces. Such equipment includes for example roller blinds, domestic robots, lighting systems, heating systems, surveillance or security systems, etc. They may fall within the home automation sector or the economic activity sector of the space. Generally, such devices can be controlled by separate remote controls which are dedicated to each device, or by applications which are accessible on smartphones or on tablets.

However, nowadays other tasks to be performed may concern the activities of an individual or a corporate member on social networks, or actions he or she is to carry out in response to new content appearing on sites accessible via the Internet. These tasks require the user to connect to the social network or site concerned in order to perform desired actions, such as sending a response, monitoring for notifications, interventions, postings, etc.

However, all device controls that are necessary and/or tasks to be performed on social networks in response to Internet content constitute a significant and time-consuming burden. To reduce this burden, many devices can be programmed by a user so that each device is activated automatically at a later time without intervention. However, the programming modes that are implemented vary from one device to another, so that the actual programming of a device requires the user to consult instructions specific to that device. In addition, the programming of each device must be carried out using an interface specific to that device, either on the device itself, or by means of a remote control dedicated to the device, or by means of a site of the supplier or manufacturer of the device, which is accessible via the Internet. This abundance of programming interfaces constitutes an additional difficulty for the user, in addition to those due by the logic and the programming languages which vary from one device to another.

In addition, programming modes of the "condition then action" type, popularized by the site IFTTT.com (IFTTT for "If This Then That"), make it possible to create small programs composed of instructions which each link a condition to an action to execute. Although this programming mode is a simplification compared to others which have been used for long time, such programming can appear abstract to a user unaccustomed to computers or to the use of automated systems.

Based on this situation, there is therefore a need for a user to be able to program a number of devices or apparatuses, quickly and easily.

In addition, the need concerns a common programming interface which is compatible with multiple devices or apparatuses.

SUMMARY

To meet this or other needs, according to a first aspect, a universal programming station with orientable blocks is proposed, intended for programming operations of at least one device. In this station, respective orientations of several blocks on a support of the station correspond, by a configuration of said several blocks and of the support, to at least one programming instruction to program an operation of the device, and the station is provided with a detection module configured to detect the respective orientations of the blocks carried by the support, and with a communication module configured to send to a management platform, by means of a communication network, data representing the at least one programming instruction corresponding to the blocks and to their respective orientations on the support.

The proposed station, comprising a support and blocks, thus constitutes a programming tool which is visual, simple, and quick to use, making it possible to program a device by manual actions which consist of manipulating blocks in order to orient them in relation to a support. Such a programming tool therefore makes the programming of the operation of a device, or the modification of existing programming, possible for any user even if inexperienced in computer science or in the field of automated systems.

Furthermore, the proposed station may be used to program one or more devices, without the model of this station needing to be adapted to each device. In this sense, the proposed programming station is said to be universal. This universality can in particular be furthered if the station is configured to return to the management platform only data relating to the positions and orientations of the blocks on the support, without data concerning the programming instructions assigned to the orientations of the blocks. Conversion of the orientations of the blocks into one or more programming instructions can then be carried out and stored in the management platform.

In general, the station's communication module may be configured, in one or more embodiments, to perform data communication with the management platform via communication links which include a wireless segment starting from the station. In particular, the station may communicate via a service gateway, commonly called a "box", using a data communication technology, for example a wireless technology such as WiFi®, Bluetooth® (BT), or one of its variants.

In preferred embodiments, the station may further be configured for, following a repositioning on the support of at least one block whose orientation has been modified by a user, identifying the modified orientation of the at least one block as resulting from the repositioning, and sending to the management platform new data which represent at least one new programming instruction resulting from said modified orientation of the at least one block. Such a station reprogramming mode, by repositioning one or more blocks, is even more manual and easy to implement for a user who is inexperienced in computer science or in automated systems.

In other preferred embodiments, or in combination with the previous ones, at least one of the blocks may be detachable and repositionable on the support with several distinct orientations, for exposing respective faces of several of the blocks next to each other on the support, in order to compose a combination of the exposed faces of said several blocks which corresponds to the programming instruction. Such a possibility of detaching blocks from the support in order to modify their orientation or position on the support provides easier manipulation of the station. In particular, the actions of programming and then reprogramming the station are more natural for the user, without constraints due to the presence of a permanent attachment of each block to the support.

Again in preferred embodiments, at least one of the blocks may have several faces which are equipped with respective displays. Writings which are present on these faces can thus be modified without the block concerned being exchanged with another one provided with different writing. The universality of the programming station can therefore be further increased in this manner.

For such embodiments with displays, the communication module may further be configured to receive, from the management platform by means of the communication network, programming instructions which are available or programming instruction elements which are available for displaying on these display faces.

Also for embodiments with displays, and in the case where the communication module is configured to receive programming instruction elements which are available to be displayed on the faces equipped with displays, at least some of these programming instruction elements may each specify at least part of an activation condition, or each at least partly specify an operation of a device. Then, programming instructions which are accessible to the user by means of the station may each be composed of an activation condition which is combined with an operation of a device. The proposed station can thus enable the construction of programming instructions, each by assembling an activation condition with a device operation. A large number of combinations, and therefore of different instructions, are thus accessible by the programming station, and each programming instruction can be constructed by successively selecting each of its component programming instruction elements.

To further increase the number of different instructions that are accessible by the programming station, some of the programming instruction elements which specify part of an activation condition may each specify a condition parameter or a condition intended to relate to a condition parameter. Likewise, some of the programming instruction elements which partly specify a device operation may each specify a device to be activated or a device operation to be activated if the activation condition is fulfilled. A programming instruction can thus result from the particular association of four programming instruction elements, therefore a greater number of different combinations, all accessible by the programming station.

Again for embodiments with displays, the universal programming station may further be configured for, upon detecting that a block has been removed from the support, displaying on faces of the removed block programming instruction elements which have been selected based on at least one other programming instruction element which is determined by an exposed face of another block which has remained on the support. Programming instruction elements which are displayed on the removed block thus can constitute a contextual offer of programming instruction elements, in other words a preselection of programming instruction elements compatible or consistent with at least one other programming instruction element which is displayed on an exposed face of a block adjacent to the removed block. The programming or reprogramming of the station by the user is then even further facilitated. Such contextual preselection of programming instruction elements, in order to display them on the faces of the removed block, may be performed by the management platform, then each programming instruction element so preselected may be transmitted to the station in order to be displayed on the removed block.

In one or more embodiments, the station may also be configured so that at least one of the blocks displays, on at least one of its faces, a setting or a parameter value which is applicable to the station, and this setting or this parameter value is applied to the station if the face of the block on which it is displayed is exposed on the support. The station thus allows configuring the parameters of its own operation.

Again for embodiments with displays, at least some of the blocks may each have several faces which are exposed simultaneously when they are positioned on the support, the simultaneously exposed faces of a same block then contributing to programming instructions or programming instruction elements. In this case, the station may further be configured so that when a block with several simultaneously exposed faces is removed from the support and then repositioned on the support in order to select a programming instruction via one of the exposed faces of this block, a programming instruction element which was displayed on another of the exposed faces of the same block before removal, is displayed again after the block has been repositioned on the support. In other words, the faces of a block with several faces which are exposed simultaneously on the support have at least two functions: a first function of displaying the programming instruction elements which had previously been selected and which are currently applied, when the block is positioned on the support, and also a second function of presenting programming instruction elements which are available, when the block is removed from the support. Returning back to the first function may be automatically triggered when the block is repositioned on the support.

In various embodiments, each block may be of substantially cubic shape, or may be a rectangular parallelepiped. In this case, the support may be configured to hold eight blocks in a three-dimensional juxtaposition of 2 blocks×2 blocks×2 blocks, along three juxtaposition directions which are perpendicular to the faces of the blocks. The station is then easy and pleasant for the user to handle.

Furthermore, in other preferred embodiments, the support may be designed to correspond to a spatial distribution of at least one device within a geographical area, and be configured to hold each block which relates to the programming of that device at a location on the support which corresponds to a location of the device within the geographical area.

According to a second aspect, a method for programming operations of at least one device is proposed, which comprises:

/1/ providing a universal programming station which is in accordance with the first aspect, and connecting it to a management platform of that station by means of a communication network;

/2/ by the management platform: configuring the blocks and support of the station, by assigning programming instructions or programming instruction elements to the orientations of the blocks on the support;

/3/ by the station: detecting current orientations of the blocks carried by the support, then sending to the management platform, by means of the communication network, data which identify these current orientations of the blocks;

/4/ by a user: modifying an orientation of at least one of the blocks on the support, in order to form a new current orientation of the block;

/5/ by the station: repeating step /3/ for the new current orientation of each block whose orientation has been modified;

/6/ by the management platform: determining at least one programming instruction which corresponds to the current orientations of the blocks on the support, as identified by the data received, then in collaboration with another platform relating to the device, controlling an operation of the device which is in accordance with the determined programming instruction.

The programming instructions or programming instruction elements which are used to configure the blocks may be received by the management platform from the other platform relating to the device. It is thus possible to take into account features that are special to each device to be programmed, in particular according to its manufacturer and options it may have.

When block faces are equipped with displays, the method may further comprise:

by the management platform: transmitting to the station, by means of the communication network, the programming instructions or programming instruction elements assigned to those of the block faces equipped with displays which are exposed on the support;

by the station: for the blocks carried by the support, displaying, on the exposed block faces equipped with displays, the programming instructions or programming instruction elements which are assigned to these faces.

When one of the blocks is removed from the support, the method may further comprise:

by the station: displaying, on several of the faces of the removed block which are equipped with displays, programming instructions or programming instruction elements which are available for alternative selection by the user by modifying the orientation of the block and repositioning it on the support.

Finally, in general, each device whose operations are programmable by means of the proposed station and using the proposed method may be a home automation device which is installed in a living space to which the station is dedicated.

BRIEF DESCRIPTION OF THE DRAWINGS

Other features and advantages of the present invention will be apparent from the following description of some non-limiting exemplary embodiments, with reference to the appended drawings in which.

DETAILED DESCRIPTION OF ILLUSTRATIVE EMBODIMENTS

Figure 1:
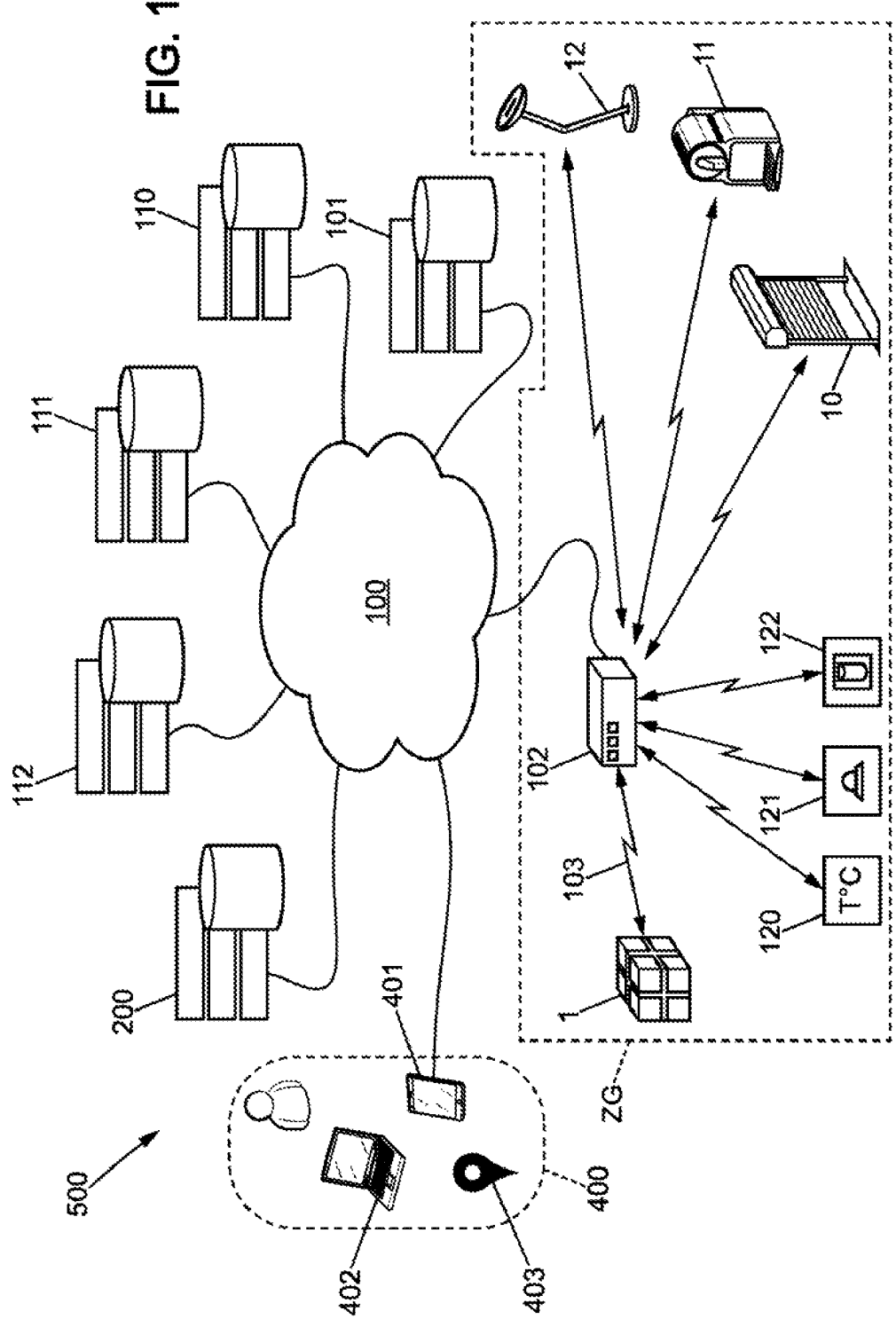
FIG. 1 is a block diagram of elements required to implement a universal programming station with orientable blocks according to one or more embodiments.

For clarity, the dimensions of the elements represented in these figures do not correspond to actual dimensions nor to ratios of actual dimensions. In addition, identical references indicated in different figures denote elements that are identical or have identical functions.

In addition, the skilled person will realize that the teachings herein may be implemented in different forms according to different embodiments, and that the structures and/or functions described below only represent certain specific embodiments. In particular, the skilled person will understand that an aspect of the systems, programming stations, platforms, user devices, and methods described herein may be implemented independently of other aspects, and that different aspects may be combined in different ways.

The present description refers to functions, motors, units, modules, platforms, and diagram illustrations of methods and devices according to one or more embodiments. Each of the functions, motors, modules, platforms, units, and diagrams described may be implemented as hardware, software (including as embedded software ("firmware") or "middleware"), microcode, or any combination thereof. In the case of implementation as software, the functions, motors, units, modules, and/or diagram illustrations may be implemented by computer program instructions or software code, which may be stored or transmitted on a computer-readable medium, including a non-transitory medium, or a medium loaded into the memory of a generic, specific, computer, or any other programmable data processing device or apparatus in order to produce a machine, such that the computer program instructions or software code executed on the computer or the programmable data processing device or apparatus constitute means for implementing these functions.

Embodiments of a computer-readable medium include, but are not limited to, computer storage media and communication media, including any media that facilitates the transfer of a computer program from one location to another. "Computer storage medium/media" is understood to mean any physical medium that can be accessed by computer. Examples of computer storage media include, but are not limited to, flash memory drives or components or any other flash memory device (for example USB keys, memory keys, memory sticks, disk keys), CD-ROMs or other optical data storage devices, DVDs, magnetic disk data storage devices or other magnetic data storage devices, data memory components, RAM, ROM, EEPROM, memory cards ("smart cards"), SSD ("Solid State Drive") type memories, and any other form of medium usable for transporting or storing or saving data or data structures that can be read by a computer processor.

In addition, various forms of computer-readable media can transmit or carry instructions to a computer, such as a router, gateway, server, or any data transmission device, whether this involves wired transmission (by coaxial cable, optical fiber, telephone wires, DSL cable, or Ethernet cable), wireless transmission (by infrared, radio, cellular, microwave), or virtualized transmission devices (virtual router, virtual gateway, virtual tunnel endpoint, virtual firewall). Depending on the embodiments, the instructions may include code of any computer programming language or computer program element, such as, without limitation, assembly languages, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and Bash scripting.

In addition, the terms "in particular", "for example", "exemplary", "typically" are used herein to designate examples or illustrations of non-limiting embodiments which do not necessarily correspond to embodiments that are preferred or advantageous in comparison to other possible aspects or embodiments.

"Server" or "platform" is understood herein to mean any point of service (whether virtualized or not) or device offering data processing, one or more databases, and/or data communication functions. For example, and in a non-limiting manner, the term "server" or the term "platform" may refer to a physical processor operatively coupled with communication functions, database and associated data storage functions, or may refer to a network, group, assembly, or complex of processors and associated data storage and networking devices, as well as an operating system and one or more database systems and application software in support of the services and functions provided by the server. A computing device may be configured to send and receive signals, via wireless and/or wired transmission network(s), or may be configured to process and/or store data or signals, and can therefore operate as a server. Devices configured to operate as a server can thus include, as non-limiting examples, dedicated rack-mounted servers, desktop computers, laptop computers, service gateways (sometimes called "boxes" or "residential gateways"), multimedia decoders (sometimes called "set-top boxes"), and integrated devices combining various functionalities, such as two or more of the functionalities mentioned above. Servers can vary widely in configuration or capacity, but a server will usually include one or more central processing units and a memory. A server may also include one or more mass storage devices, one or more power supplies, one or more wireless and/or wired network interfaces, one or more input/output interfaces, one or more operating systems, such as Windows Server, Mac OS X, Unix, Linux, FreeBSD, or an equivalent.

The terms "network" and "communication network" as used herein refer to one or more data links that can couple or connect devices, possibly virtualized, so as to allow the transport of electronic data between computer systems and/or modules and/or other electronic devices or equipment, such as between a server and a client device or other types of devices, including between wireless devices paired or connected by a wireless network, for example. A network may also include mass storage for storing data, such as a NAS ("network attached storage"), a SAN ("storage area network"), or any other form of medium readable by a computer or by a machine, for example. A network may include, wholly or in part, the Internet, one or more local area networks (LANs), one or more wide area networks (WANs), connections that are wired, wireless, cellular, or any combination of these different networks. Similarly, subnetworks may use different architectures or be compatible or compliant with different protocols, and interoperate with larger networks. Different types of devices may be used to render different architectures or different protocols interoperable. For example, a router may be used to provide a communication link or a data link between two LANs that would otherwise be separate and independent.

The terms "operatively coupled", "coupled", "mounted", "connected", and their various variants and forms used herein refer to couplings, connections, assemblies, which may be direct or indirect, and in particular comprise connections between electronic devices or between portions of such devices that enable operations and functions as described herein. In addition, the terms "connected" and "coupled" are not limited to physical or mechanical connections or couplings. For example, an operable coupling may include one or more wired connections and/or one or more wireless connections between two or more devices which allow simplex and/or duplex communication links between devices or portions of devices. According to another example, an operable coupling or a connection may include a coupling by wired and/or wireless link to enable data communications between a server of the proposed system and another device of the system.

The terms "application" or "application program" (AP) and variants thereof ("app", "webapp", etc.) as used herein correspond to any tool that functions and is operated by means of a computer, in order to provide or execute one or more functions or tasks for a user or another application program. To interact with and control an application program, a user interface may be provided on the device on which the application program is implemented. For example, a graphical user interface (GUI) may be generated and displayed on a screen of the user device, or an audio user interface may be provided to the user by using a loudspeaker, headphones, or an audio output.

FIG. 1 is a diagram illustrating an embodiment in which a system 500 comprises a universal programming station with orientable blocks as proposed herein and designated as a whole by the reference 1, configured to communicate with a management platform 101 by means of a network or several networks comprising a communication network 100, to which a service gateway 102, commonly called a "box", is connected. The programming station 1 will preferably be configured so that the communication link 103 with the service gateway 102 is wireless, for example using WiFi® data communication technology, or Zigbee® technology, or a Bluetooth® type of wireless communication technology (in particular Bluetooth Low Energy® or BLE technology), or Z-Wave®, and a communication protocol of the IEEE 802.15.4 type. The use of a wireless connection in the communication segment which terminates at the station 1 in effect allows a user to manipulate the station 1 without hindrance.

Depending on the embodiment, the programming station 1 and the management platform 101 may be interconnected and exchange data on one or more communication links, using one or more networks of different types, such as a fixed network, a cellular network (for example according to standards such as 2G (GSM, GPRS, EDGE), 3G (UMTS), 4G (LTE), LTE-A, LTE-M, CDMA, CDMA2000, HSPA, 5G, or their variants or upgrades), another type of radio network (for example WiFi® or Bluetooth®), an IP network, a combination of several of these networks, etc. To do so, the programming station 1 and the management platform 101 will be configured with suitable data communication means.

A resource space (processing, memory, etc.) is thus assigned to the station 1 in the management platform 101. In the embodiment illustrated in FIG. 1, the management platform 101 is connected to the network 100, so that data can be transmitted between the platform 101 and the station 1. In one or more embodiments, the management platform 101 may be hosted by one or more servers, for example in a cloud. This or these servers, which may be any type of device or system comprising data processing means, such as a computer or a set of interconnected computers (in a context of a virtualized network for example), and may comprise and/or be connected to one or more databases in order to store data, can be configured to exchange data with one or more programming stations 1, and in particular to receive from one or more programming stations data representing at least one programming instruction for the operation of at least one device.

In one or more embodiments, the management platform 101 may be provided with an application programming interface ("API") or any other type of interface (not represented in FIG. 1), configured for transmitting data to and receiving data from one or more programming stations, and in particular for receiving data representing at least one programming instruction for the operation of at least one device.

In one or more embodiments, the system 500 comprises one or more devices (or objects), for example home automation devices such as a roller blind 10, a coffee maker 11, and a lighting system 12, which are cited as examples (illustrated in FIG. 1) but without limitation concerning their nature and their number, which are respectively connected to dedicated platforms for managing connected objects 110, 111, 112, for example through the communication network 100, as illustrated in FIG. 1. The connection of each of the devices or objects connected to the network 100 may also but not necessarily be achieved via the gateway 102. Possibly, a software function intended to be executed by a terminal which is connected to the network 100, may have the function of a device within the meaning of the present application, in other words it can be programmed using the station 1. Such a software function may, in particular, be posting a statement on a social network or sending an email. The devices which are intended to be programmed by means of the station 1, comprising devices 10-12 by way of illustration, may be located within or close to a restricted geographical area, denoted ZG. For example, such an area ZG may be a living space.

In one or more embodiments, each dedicated platform may also be hosted by one or more servers, for example in a cloud. In the embodiment illustrated in FIG. 1, a resource space (processing, memory, etc.) in the platform 110 is allocated to the roller blind 10, a space in the platform 111 is allocated to the coffee maker 11, and a space in the platform 112 is allocated to the lighting system 12. The platforms 110-112 for managing connected objects may be managed by the respective suppliers of the devices 10, 11, 12, but this is not necessarily so. Each of the platforms 110-112 has operating data for the corresponding device, and can communicate with it via the network 100, in particular by using application programming interfaces, or APIs. In particular, each of the platforms 110-112 may be provided with an API and with data communication means configured to communicate with the supervised device in order to remotely trigger an operation of the corresponding device, to communicate information relating to this device to another platform, and to exchange data with the management platform 101.

The system 500 further comprises connected objects generating data, such as sensors, for example such as the temperature sensor 120, the brightness sensor 121, and the presence sensor 122 illustrated in FIG. 1, which are cited as examples but without limitation concerning their nature and number. In one or more embodiments, these sensors are configured to transmit data to the management platform 101, for example via the communication network 100, possibly with more dedicated resource spaces in platforms (not shown). The mode for connecting each of the sensors to the communication network 100 can vary according to the embodiment and the sensor. For example, the sensors for temperature 120, brightness 121, and presence 22 may be connected to the network 100 by a wireless personal area network (WPAN) using a wireless communication technology such as Bluetooth® (and in particular Bluetooth Low Energy® or BLE), Zigbee®, or Z-Wave® and an IEEE 802.15.4 type communication protocol. A function for monitoring content able to be managed and/or generated by an online service, appearing on a social network or on the Internet, and which is executed by a terminal connected to the communication network 100, can also constitute a sensor within the meaning of the present document.

The system 500 of FIG. 1 comprises a set 400 of user devices or functions 401, 402, 403, configured to provide a management user interface (in particular comprising configuration, control, use, and command) of the programming station 1. Users, via their online services (for example via their social network), via their user device(s), via applications on their smartphone(s) or Webapps (applications executable from a browser) on their computer(s), and/or their messaging service(s), can thus interact with the station 1.

In one or more embodiments, the user device 401, 402 is configured to communicate via wireless network, for example of the WiFi® type, with the service gateway 102 in order to exchange data with the management platform 101. Depending on the embodiment, an application configured for the management (comprising in particular the configuration, control, use, and command) of one or more programming stations 1, also called a companion application, may be executed by the user device 401, 402. The companion application may comprise a user interface for the user commands for the one or more programming stations. The user device 401, 402 is then suitable for implementing the companion application, and typically comprises a screen, for example a touch screen, for displaying a graphical user interface (GUI) of the companion application, a microphone for recording voice commands, and other input interfaces configured according to the embodiment of the companion application for inputting user commands of the application.

In one or more embodiments, the user device 401, 402 comprises a memory, a processing unit, equipped for example with a processor P and controlled by an application, in particular the companion application dedicated to the control and/or configuration of one or more programming stations, or a computer program configured to implement one or more embodiments of the proposed programming methods.

At initialization, the code instructions of the computer program are for example loaded into RAM memory before being executed by the processor of the processing unit. The processor of the processing unit is configured to implement the control method according to at least one embodiment, according to the instructions of the computer program, in order to exchange data with the management platform 101 for the purposes of controlling one or several programming stations.

The user device 401, 402 may be a portable telephone, for example a smartphone, a tablet, a computer, an electronic component, or another device comprising a communication module, a user interface module (comprising for example a screen, a microphone, a loudspeaker, a keyboard) and a processor operatively coupled to memory, as well as, depending on the embodiment chosen, other associated hardware elements such as a network interface and a media player for reading a removable storage medium and writing to such a medium (not represented in the figure). The removable storage medium may be, for example, a compact disc (CD), a digital video/versatile disc (DVD), a flash drive, a USB stick, etc. Depending on the embodiment, the memory or the removable storage medium contains instructions which, when executed by the processing unit, cause this processing unit to exchange data with the management platform 101 according to at least one embodiment of the proposed programming method.

In one or more embodiments, at least some of the user devices 401, 402 of the system 500 may integrate a geolocation function 403, for example in compliance with the positioning system by satellite called GPS ("Global Positioning System") or Galileo, operatively coupled with a module (for example a software app or Web app) for controlling the station 1 of the device, and configured to transmit geolocation data of the user device to this module, typically via an API, for possible use in programming the station 1. From a system point of view, the geolocation function 403 implemented in software and/or hardware form within a user device 401, 402 of the system 500 can be seen as a connected object generating data as described above.

Depending on the embodiment, the control module of the station 1 with which the user device 401, 402 is typically provided (implemented by the companion application as described above in connection with one or more embodiments), may be configured to communicate with the management platform 101, for example via the network 100. Conversely, in one or more embodiments, the management platform 101 may be provided with an API configured for exchanging data with one or more programming station control modules, for example programming management applications respectively executed on one or several user devices 401, 402.

In one or more embodiments, the configuration (initial configuration or reconfiguration) and control of a programming station 1 can be controlled by the management platform 101, and configuration and control data stored in memory within the management platform 101, for example linked to a profile comprising an identifier and configuration data.

Depending on the embodiment, a configuration profile may be defined in connection with a programming station, or be defined in connection with a user or a group of users, in order to be applied to one or more programming stations. The configuration profile may contain one or more programming station identifiers and/or a user identifier. A hierarchy of different profiles could also be used to define levels of access to configuration functions of a station, and/or configuration priority levels.

For example, a user A having a higher profile than a user B could have access to a greater number of configuration functionalities than user B. To use the example of FIG. 1, in a context of a household comprising adults and children, the adults can define a profile for themselves allowing them to control all functionalities of the station 1, and in particular the programming of all the equipment or devices 10, 11, 12 which can be programmed, while the children may have a profile only allowing them to program the lamp 12. In a business context, a manager or team leader may have a higher configuration profile than the team members, and therefore can access a greater number of configuration and control functionalities for one or more programming stations.

Defining profiles associated with programming stations advantageously makes it possible to define hierarchical levels between different programming stations, for example such as a "master" or "administrator" level and respectively a "slave" or "standard" level. Such different hierarchical levels associated with the respective profiles of programming stations advantageously enable controlling a set of programming stations by means of a single station. For example, for a group of N programming stations, it may be advantageous to define an "administrator" profile for one of the N stations and a "standard" profile for the N−1 other stations. The different levels defined in the profiles respectively associated with the stations may for example, by configuration, have the consequence that the programming associated with the "administrator" station will be propagated to the "standard" stations, via the management platform.

For example, upon receiving programming instruction data originating from a programming station among a plurality of programming stations, where the programming stations of the plurality of stations are operating according to one of the embodiments described herein, the management platform may be configured, in one or more embodiments, to retrieve the profile of the programming station that sent the data, and to determine a hierarchical level associated with that profile. If the determined hierarchical level corresponds to a higher level in the predefined profile hierarchy, the management platform may be configured to transmit all or part of the programming instructions associated with that station to the other stations of the plurality of stations having a lower hierarchical level associated with their profile than the hierarchical level of the station. This method advantageously makes it possible to pre-empt some or all of the operation of programming stations among a plurality of stations by defining hierarchical levels associated with a station profile, by means of one or more stations to which a higher level (for example called "master" or "administrator") in the hierarchy has been associated.

In one or more embodiments, a programming station which has an associated profile of a first level in a predefined profile hierarchy can be controlled, and in particular can receive programming instructions, in different ways: from a programming station with which is associated a profile of a second level that is higher than the first level in the predefined hierarchy, and from an application executed on a user device, as described herein, in both cases via the management platform.

The system 500 illustrated in FIG. 1 further comprises one or more external platforms 200, for example of the data server type (or "data lake" or "data sets"), comprising one or more databases, and which can be configured to supply various information to the management platform 101, particularly again via the communication network 100. This information may concern, without the following examples being limiting, road traffic data, the occurrence of events selected by a predetermined filter, etc.

In one or more embodiments, the station 1 has a data communication link with the management platform 101, for example by means of an appropriate API, and the management platform 101 has a data communication link with each of the platforms 110-112, 200 and with those of the sensors 120-122, by means of other appropriate application programming interfaces.

Figure 2A:
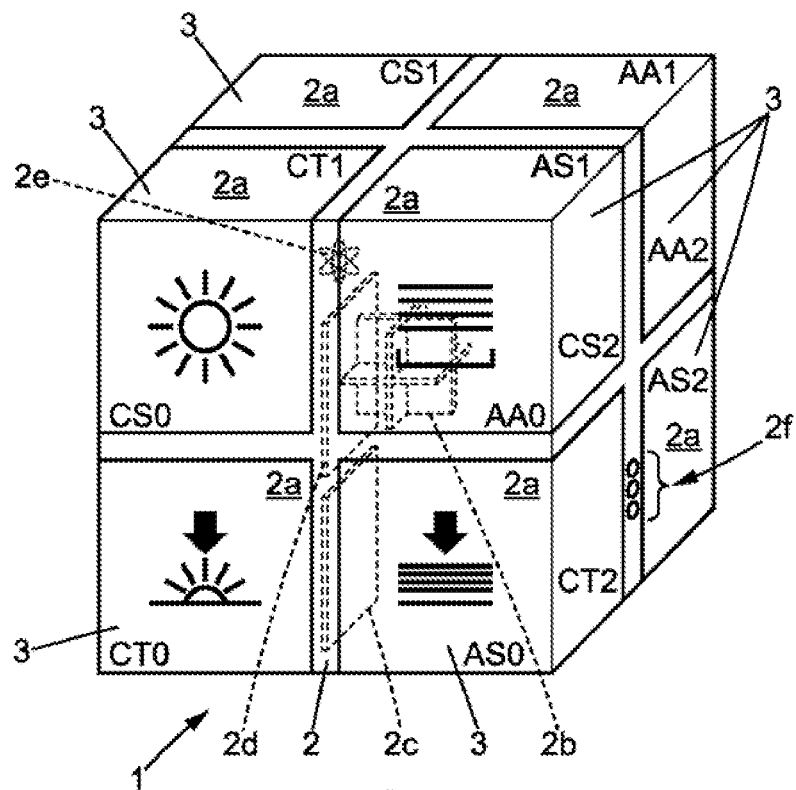
FIG. 2a shows one particular embodiment of a universal programming station with orientable blocks.
Figure 2B:
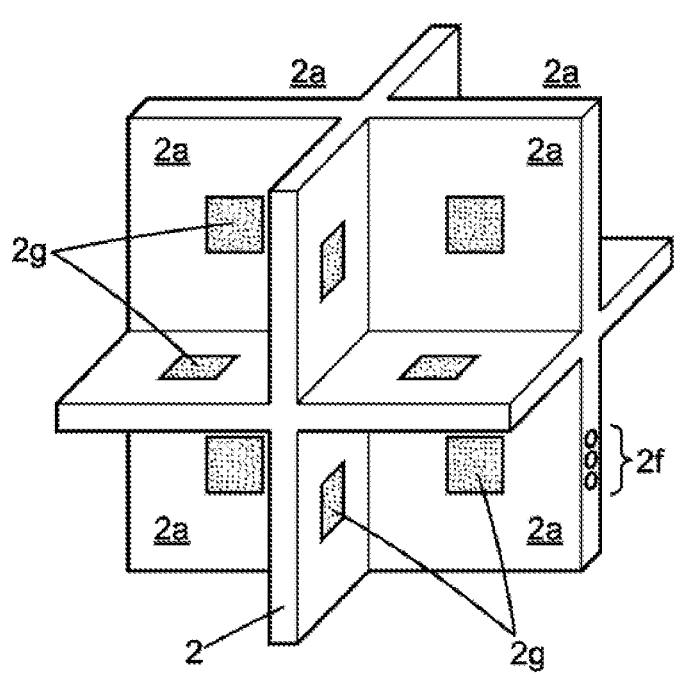
FIG. 2b shows one particular embodiment of a support of a universal programming station with orientable blocks according to one or more embodiments.

With reference to FIGS. 1, 2*a*, and 2*b*, the station 1 comprises a support 2 and several blocks 3, for example eight blocks each in the form of a cube, and which are hereinafter called cubes for clarity and illustrative purposes. In the particular embodiment which is represented, the support 2 has the shape of a three-dimensional cross (FIG. 2*b*), which defines eight locations 2*a* where one of the cubes 3 can be positioned. Each cube 3 is preferably detachable from the support 2, while being able to be retained in one of the locations 2*a* in several alternative orientations of the cube relative to the support 2. In the embodiment represented, each cube 3 can be positioned in one of the eight locations 2*a* of the support 2, in at most 24 different orientations. Many devices may be used to retain each cube 3 at one of the locations 2*a* of the support 2, in a manner that is detachable and compatible with all orientations of the cube within the location. For example, systems based on magnets 2*g* or clips may be used. In addition, the support 2 and each cube 3 are provided with a recognition system which allows a detection module 2*b* incorporated in the support 2 to identify the orientation and location of each cube 3 on the support 2, and to detect when this cube 3 is removed from the support 2 and then repositioned. Depending on the embodiment chosen, it is possible to use a mechanical detection system, for example based on relief patterns for a mechanical detection system, an electrical detection system, for example based on metal contacts, or an optical detection system, for example based on image patterns.

In one or more embodiments, the support 2 incorporates a controller which is operatively coupled to a memory module (not represented in the figure). The controller can be configured to store in memory the orientations and locations of each cube 3 positioned on the support 2.

The controller may further be configured to control the elements and modules of the programming station 1, and in particular those of the support 2. The controller may comprise a component making use of one or more processors, and be controlled by an application or a computer program, configured to implement one or more embodiments of the method proposed herein. At initialization, the code instructions of the computer program are for example loaded into RAM memory of the memory module, before being executed by a processor of the controller. For example, the controller may be a microcontroller comprising a processor, or a processor coupled to one or more controllers.

The memory module may comprise one or more memories, for example read-only memory or ROM and/or random access memory or RAM, including one or more computer storage media in which is stored a computer program ("firmware") executable by a processor of the controller of the programming station 1. The memory module is preferably chosen to be capable of storing the orientations and locations of each cube 3 positioned on the support 2 as described above, for example in a flash memory. Depending on the embodiment, the one or more memory(ies) of the memory module contain computer program instructions which, when executed by the controller, lead this controller to perform or control the elements and modules of the exemplary implementations of the proposed programming station 1 described herein.

In one or more embodiments, the support 2 also incorporates a communication module 2*c*, operatively coupled to the processor. The communication module 2*c* comprises a communication interface on a local area network, of the wired type (for example Ethernet) and/or, preferably, of the wireless type (for example WiFi (in compliance with the 802.11 standards published by the standards body IEEE ("Institute of Electrical and Electronics Engineers")), Bluetooth® (BT) (in all its variants), or Bluetooth Low Energy® (BLE)). The communication interface on a local area network may be configured to connect the programming station 1 to a local area network and communicate with other nodes of the local area network and/or connect to a broadband network, such as the Internet, via the local area network (for example by means of a gateway, such as service gateway 102, between the local area network and a broadband network such as network 100), in particular in order to establish the communication link 103 with the management platform 101. The communication link between the station 1 and the management platform 101 can thus be implemented, in one or more embodiments, by the communication module 2*c*, and depending on the embodiment uses the communication link 103 established between the support 2 of the station 1 and the service gateway 102. The communication interface on a local area network can be chosen to allow secure data exchanges to and from the management platform 101. For example, the communication interface on a local area network will be able to implement a communication protocol in compliance with the S-HTTP standard ("Secure HyperText Transfer Protocol"), for example by using a secure WebSocket connection (according to the RFC6455 "Request for Comments" specification of "The WebSocket Protocol" of the IETF ("Internet Engineering Task Force")).

Depending on the embodiment, the support 2 may also incorporate a power supply 2*d* (such as a battery for example), a movement identification module 2*e*, for example such as an accelerometer, and/or interfaces 2*f* which are intended for the user of the station 1, such as a touch sensor, visual indicators, a loudspeaker, a microphone, etc.

The modules and units of the programming station 1, including the communication module 2*c*, the power supply 2*d*, the motion identification module 2*e*, and the interfaces 2*f*, may be operatively coupled with one another by means of the controller of the programming station 1.

In one or more embodiments, the management platform 101 may be arranged to remember devices 10, 11, 12 to be programmed by means of the programming station 1, for example during a configuration phase of the station 1, and to collect operating data for these devices 10, 11, 12, from the management platforms 110, 111, 112 of these devices. These operating data may in particular relate to the turning on or off of a device, their possible directions of operation, amplitudes of operating intensities, speeds, and/or variations, etc., such as, depending on the case, opening or closing the roller blind 10, turning on the coffee maker 11, increasing or reducing the power of the lighting system 12, etc. The management platform 101 may also be configured to remember the sensors for which measurement or detection results are available.

The management platform 101 can thus be configured to store in memory the programming environment of connected objects or devices whose operation can be programmed. The architecture of the system 500, in which the management platform 101 is placed at the center of all data communications relating to programming a device, advantageously makes it possible to relieve the user of any dependency on the specifics of each programmable device and its programming environment. This architecture also allows great flexibility and a high capacity for adapting to changes to the connected objects or devices whose operation can be programmed, or to their programming environment. Indeed, changes to the programming environment can be processed at the management platform 101, and be made completely transparent to the user of the programming station 1. In addition, the addition or removal of a device 10, 11, 12 whose operation can be programmed, from the programming management provided by the proposed system, can also be managed at the management platform 101, it being possible to configure the programming station 1 to be controlled by the management platform 101, in particular in order to carry out programming updates reflecting changes to the devices whose operation is programmed.

Thus, in one or more embodiments, the management platform is configured so that an additional device or sensor can be added or removed by the user from those already stored by the management platform 101. Such a modification may for example be carried out using a user interface available via an appropriate application (for example a mobile application on a smartphone or a tablet, or a Web app in a browser executed on a personal computer, a smartphone, or a tablet) executed on a user device 401, 402, as described above.

Based on knowledge of the objects (including the devices and sensors) which are available for the station 1, and preferably also on knowledge of the ecosystem to which the station 1 is dedicated, the platform 101 establishes a set of programming instructions, or programming instruction elements, which are likely to be of interest to the user of the ecosystem to which the stored devices belong. In one or more embodiments, a programming instruction can be reduced to an instruction for switching an appliance on or off, intended to be executed immediately as soon as the instruction is selected. For example, such a simple instruction could be turning the coffee maker 11 on or off. In more elaborate cases, a programming instruction may be formed by combining two instruction elements, which are respectively an activation condition and an action to be triggered when the activation condition is satisfied. For example, when the level of ambient light detected by the brightness sensor 121 falls below a determined threshold, the lighting system 12 can be switched on.

In an even more elaborate version, applicable to at least some of the programming instructions which can be selected by means of the station 1, a programming instruction may be constructed by combining four elements, which belong to the following categories:

programming instruction elements which indicate condition parameters, meaning each one indicates one or more parameters on the basis of which the operation of one of the devices will or will not be activated. This first category can be called programming themes, as the condition parameter determines a theme of action by one of the devices;

programming instruction elements which indicate a condition to be examined, for example such as a threshold value to be exceeded. The combination of a condition parameter with a condition, within a programming instruction, constitutes an activation condition for at least one of the devices;

programming instruction elements which designate at least one of the devices to be activated; and programming instruction elements which designate an operating mode to activate or discontinue for the designated device. The combination, within a programming instruction, of a device designation with an operation for that device constitutes an action to be executed.

A programming instruction can then be constructed by combining an activation condition with an action to be executed. It therefore results from combining four instruction elements which each belong to one of the four categories set forth above, leading to triggering a device operation if the condition relating to the indicated parameter is satisfied. Such a construction method is therefore of the "condition/action" type.

In some embodiments which are in accordance with the geometry represented in FIG. 2a for the station 1, a complete programming instruction may be composed of four instruction elements which appear on the exposed faces of four adjacent cubes 3 on the same side of the support 2. Thus, the complete programming instruction is visible to the user by observing the corresponding side of the station 1. In one or more embodiments, two faces of adjacent cubes may correspond to the definition of a condition, comprising for example one cube face which establishes a theme and the other cube face which establishes a condition on this theme. Two other faces of adjacent cubes may correspond to the definition of an action to be performed when the condition defined by the first two cube faces is met, the action comprising for example a device or object to be controlled and a command to be implemented on that device or object. In the example of FIG. 2a, the faces of the cubes 3 which are exposed on the front of the station 1 relative to its orientation in the figure (faces CS0, CT0, AA0, AS0) are oriented so as to place the two cube faces relating to the condition on the left part of the exposed side, and to place the two cube faces relating to the action on the right part of the exposed side. These exposed faces indicate the following programming instruction elements:

the condition parameter is displayed on the cube 3 in the upper left location 2a (face CS0, CS for "Condition Setting"), and is the ambient brightness (programming theme for this example), for example measured by the sensor 121 in FIG. 1;

the condition is displayed on the cube 3 in the lower left location 2a (face CT0, CT for "Condition Threshold"), and is a reduction in the ambient brightness;

the device concerned is displayed on the cube 3 in the upper right location 2a (face AA0, AA for "Action Actuator"), and is the roller blind(s) 10; and the operation concerned for this (these) device(s) is displayed on the cube in the lower right location 2a (face AS0, AS for "Action Setpoint"), and is a lowering or, depending on the embodiment, a closing of the roller blind(s) 10.

This logic of positioning the faces of the cubes which are exposed on the same side of the station 1 can be repeated on other sides of the station 1, as illustrated in FIG. 2a, with the upper side of the station 1 having a cube in the upper left location with a face exposing a condition parameter or a theme (face CS1), a cube in the lower left location with a face exposing a condition corresponding to the parameter or the theme (face CT1), a cube in the upper right location with a face exposing a device or object concerned by the programming (face AA1), and a cube in the lower right location with a face exposing an action to be performed on the device or object concerned (face AS1). The same is true in the example illustrated in FIG. 2a for the right side of the programming station 1, with the order of the faces on this side being CS2, CT2, AA2, and AS2.

In one or more embodiments, a composite condition parameter may be constructed, meaning that it can result from combining several parameters to which the condition is intended to be applied. For example, a composite parameter which enables detecting the sunset may be constructed by combining the time with the ambient light level. The condition itself may consist of a time interval to which the current time will be compared, and an ambient light threshold.

Similarly, a programming instruction element may also, in one or more embodiments, be constructed by simultaneously designating several devices, of the same type or of a different type, for example one or more roller blinds 10, possibly designated with a lighting system 12. The instruction which designates the operating mode to activate can then indicate an operation for each designated device.

The programming instruction which results from the example just listed is then: if the time is within the predetermined time interval and the ambient brightness is less than the predetermined threshold, then the closing of the roller blind 10 and the turning on of the lighting system 12 are activated. This example corresponds to the front face of the station 1 as represented in FIG. 2*a*, and is given solely as an illustration.

In one or more embodiments, geolocation data of a user, obtained by means of a GPS geolocation device 403, for example incorporated in a user device 401, 402 which has communicated the data to a native application on a mobile phone 401 or to a webapp on a personal computer 402, where they are then transmitted to the management platform 101, may be used in programming instructions as a condition parameter, for example to trigger opening an electric gate when an occupant is approaching the living space. The station 1 then advantageously makes it possible to program the management of connected objects, for example located within or near a geographical area (for example a house), by creating correlations between connected objects of the geographical area of the house, and geolocation data of user(s) of these connected objects (for example geolocation data concerning a user relating to the geographical area or, depending on the embodiments, the connected objects which are controlled), via the management platform 101. Depending on the embodiment, other condition parameters may also be based on data supplied by the external platform 200, or else concern messages received in an email box.

In one or more embodiments, during a configuration phase the management platform 101 associates programming instruction elements with at least some of the faces of the cubes 3 when they are positioned on the support 2. To do so, a system for identifying the locations 2*a* available for the cubes 3 on the support 2 may be defined and stored at the management platform 101. Preferably, the association of programming instruction elements with faces of cubes 3 can be done by further taking into account the distinctive characteristics of the place to which the station 1 is dedicated, for example the distinctive characteristics of a workplace or those of a dwelling. For example, such distinctive characteristics may relate to the hours when occupants of these spaces are present. In other words, the association of programming instruction elements with faces of cubes 3 can advantageously take into account a context which is identified for the ecosystem to which the station 1 is dedicated.

In one or more embodiments, one or more cubes 3 of the station 1 can be configured to display a programming instruction or programming instruction element on one of their faces, displaying information which is consistent with the configuration established at the management platform 101. Such displays advantageously allow a user to select the desired programming instructions or programming instruction elements by orienting the cubes 3 on the support 2 so as to expose the cube faces on which these programming instructions or programming instruction elements are displayed. The orientations of the cubes 3 so selected by the user are detected by the detection module 2*b*, then transmitted by the communication module 2*c* to the management platform 101, which stores them in memory. From these orientations of the cubes 3, the management platform 101 reconstructs the programming instructions selected by the user, then via the communication network 100 collects the data (for example measurement and detection results, or data supplied by a data server, for example a meteorological data server) which are used in these programming instructions. Then, upon detecting that an activation condition of one of these programming instructions is satisfied, the management platform 101 sends an instruction to activate the operation(s) of the device(s) designated in the programming instruction, to each platform of such a designated device. The platform then remotely triggers the operation of the device concerned, using a communication mode that is available for this device.

In preferred embodiments, at least some of the faces of the cubes 3, or even all of their faces, include a display which is capable of displaying a programming instruction, or a programming instruction element as defined above. Such a display may be implemented to present various symbols or icons, which preferably are suggestive of the programming instruction element concerned. For example, in FIG. 2*a* and in accordance with the orientation of this figure, the exposed front face of the upper left cube (CS0) displays an icon of the ambient brightness in order to specify this condition parameter, the exposed front face of the lower left cube (CT0) displays a sunset icon as the condition, the exposed front face of the upper right cube (AA0) displays an icon of the roller blind 10 as the device(s) to activate, and the exposed front face of the lower right cube (AS0) displays a closure icon to specify such a closing operation for the roller blind(s) 10. Advantageously, the displays used are of the electronic ink type, which are particularly favorable due to their very low power consumption. This very low power consumption makes it possible to achieve persistence of the display with an electrical circuit using one or more capacitor(s) while the cube is no longer powered, for example when detached from the support 2. Alternatively, the displays used may be of the light-emitting diode type, providing display contrasts which are very high.

In one or more embodiments, the components which are incorporated into each cube 3, in addition to the displays on its faces, are preferably limited to components that are simple, inexpensive, consume little energy, and are few in number. However, they allow offering the user a choice between several programming instructions or programming instruction elements, which are displayed on at least some of the faces of the cube 3 when the user detaches this cube from the support 2. In particular, in one embodiment, each cube 3 may incorporate a capacitor which is electrically charged by the battery 2*d* of the support 2 when the cube is positioned in one of the locations 2*a*, and which supplies the energy necessary for all components of the cube when it is removed from the support 2. This energy in particular powers the displays on the faces of the cube, which are fixed once the cube has been removed from the support, and also ensures the functioning of any internal memories in the cube which would be required for such display.

Such an embodiment, with cube displays, is particularly advantageous in that it allows a wide variety of devices that are programmable with the station 1, without having to adapt or change the cubes according to the devices, and in that it makes it easier to offer the user contextualized programming instructions.

To do so, the management platform 101 may be arranged to configure the station 1 as described above, by assigning a programming instruction element to each cube 3 face according to the position of the cube and its orientation on the support 2. For the faces which are exposed when all cubes 3 are on the support 2, and in the case of displays on these faces, this assignment is transmitted by the management platform 101 to the communication module 2c of the station 1, then by this communication module 2c to each cube 3. The programming instruction elements which are assigned to the exposed faces of the cubes 3 are then displayed thereon. This display state for the entire station 1 advantageously indicates the programming state which is in force, as stored for the station 1 at the management platform 101.

In one or more embodiments, the management platform 101 may further assign additional programming instruction elements to the faces of cubes 3 which are not exposed, in other words those which are turned towards the support 2 in the station 1 geometry represented in FIG. 2a. These additional programming instruction elements constitute choices available to the user when the user removes one of the cubes 3 from the support 2 in order to modify one of the programming instructions. The selection of these additional programming instruction elements may be carried out by the management platform 101 as a function of the programming state in force, and possibly also as a function of other parameters in force for the ecosystem to which the station 1 is dedicated. In the jargon of a person skilled in the art, such a selection is said to be contextual, or intelligent. In one or more embodiments, selection strategies may be implemented by the management platform 101 to select the additional programming instruction elements to be assigned to the unexposed faces of the cubes 3. The management platform 101 may be arranged to transmit these additional programming instruction elements to the communication module 2c of the station 1, and each of the cubes 3 may be arranged to store within the cube 3 the additional programming instruction elements which concern its unexposed faces, in relation to the faces to which they have been assigned. Then, when the user removes one of the cubes 3, the additional programming instruction elements which have been determined by the management platform 101 are displayed on the faces of the cube which were not previously exposed on the support 2. They thus become visible to the user when the user turns the removed cube over.

In one or more embodiments, to offer a wider choice of programming instruction elements to the user, additional programming instruction elements may also be assigned, for example by the platform 101, to the faces of the cubes 3 which are exposed on the support 2. All the additional programming instruction elements are then stored in the cubes 3, each additional programming instruction element in the one of the cubes 3 which has the face to which this additional instruction element has been assigned, whether or not that face is exposed.

The programming station 1 may be configured so that, following the removal of one of the cubes 3 by the user, the programming instruction elements in force which are displayed on the cube are stored in the station 1, and replaced on the displays of its faces by the additional programming instruction elements, whether or not these faces have previously been exposed. The user thus has more extensive choice possibilities for selecting a new programming instruction element by removing one of the cubes 3, then turning it over to see all the programming instruction elements which are displayed. When this cube 3 is repositioned by the user on the support 2, the programming instruction element which is selected by the new orientation of the cube is kept displayed on the exposed face concerned. In one or more embodiments, this exposed face concerned may be predefined by configuration, and correspond for example to the upper face of the cube when it is positioned on the support, this face thus corresponding to the upper side, or to the upper face of the station 1 when the station 1 has a substantially parallelepiped shape (for example cubic). Depending on the embodiment, the identification of a side of station 1 on which can be found the exposed face of a cube 3 which will be modified, can be done on the basis of the side of the station corresponding to the configuration (for example identification of the side corresponding to the upper face of the cube) after detecting a movement of the station 1, as described above, in particular upon detecting an end of movement of the station 1 by the user, for example after detecting an absence of movement of the station 1, or an absence of movement of the station over an amplitude greater than a predetermined threshold, or a stabilization of the orientation of the station 1 or of the orientation of one of the sides of the station 1, for a predetermined period of time, for example a few seconds. In other embodiments, the side of station 1 which is intended to be affected by the upcoming programming modification may be designated by the direction of a translational movement of the station 1 which is imparted by a user, and identified by the movement identification module 2e. Such movement, which is natural, may involve bringing the station closer to the user after the user has oriented it to see the side to be modified. The station would no longer need to have a roughly horizontal upper face. In one or more embodiments, the station 1 may be configured to modify the display (for example flashing, intermittent display, changing the dimensions of the display, etc.) of elements displayed on the side identified as being concerned by the modification. The movement identification module 2e (for example an accelerometer) with which the programming station 1 may be provided, can be used to identify this face of the cube or this side of the station 1 which is concerned by any programming changes made by a user. In one or more embodiments, the identification of a side of the station 1 concerned by a possible change made by a user may be carried out as soon as a movement of the station 1 is detected by the movement identification module 2e, at which point the identified side will be stored in memory by the station 1. This advantageously makes it possible to keep in memory the data relating to a side of the station 1 possibly concerned by a change before the user removes a cube 3 from the support 2. In one or more embodiments, the other exposed faces will then be able to redisplay the same programming instruction elements as before the cube was removed, these remaining in force since they were not considered to be affected by the possible modification.

Thus, the modification of a programming instruction may therefore be carried out by the user as follows, in one or more embodiments, with reference to FIG. 3a:

the user grasps the station 1 in his or her hands, with the eight cubes 3 positioned on the support 2. The accelerometer 2e incorporated into the support 2 detects the movement of the station 1, identifies the side of the station 1 on which the exposed face of a cube 3 to be modified is located (for example by the configuration of the side of the station 1 corresponding to the upper face of the cube before detecting movement), and may further trigger updating the additional programming instruction elements stored at the station 1, for example in the cubes 3;

in one embodiment, the user can turn station 1 to see the side of the station on which is displayed the programming instruction he or she wishes to modify. In this case, the station 1 may be configured so that this movement is also detected by the accelerometer 2e, in order to identify the side of the station 1 on which the exposed face of a cube 3a to be modified is located;

the user removes, from the support 2, the cube 3a which corresponds to the element to be modified of this programming instruction. This detachment of the cube 3 is detected by the cube 3 itself, and it displays on its faces the additional programming instruction elements which it has in memory;

the user then turns the cube 3a which he or she has removed, in order to determine which of the faces of this cube displays the programming instruction element the user wishes to adopt. This manipulation of the cube 3a is illustrated in FIG. 3a, which also shows magnets 2g for retaining the cube 3a in one of the locations 2a; and the user repositions the cube 3a on the support 2 while exposing the face which displays the adopted programming instruction element on the side of the station 1 identified as being the side concerned by the modification.

In the example illustrated in FIG. 3a, the user manipulates the upper right cube 3a, and positions this cube so as to place, on the side of the station 1 on which are already positioned a cube face defining the theme of brightness (face CS0 of the cube 3 at the upper left), a cube face defining a condition relating to the theme of brightness (face CT0 of cube 3 at the lower left defining a condition of the type "if the brightness drops below a certain threshold"), and a cube face defining an action to be performed (face AS0 of the cube 3 at the lower right defining an action of the type "lowering the blinds"), a face of the cube 3a which defines the object on which a defined action is to be applied (face AA0 of the cube 3a at the upper right defining one or more blinds of a given geographical area). This upper right cube 3a, in combination with the other cubes 3 positioned on the same side of the station 1, thus makes it possible to define a programming of the type: if the brightness falls below a certain threshold, lower the blind(s) of a given geographical area.

In one or more embodiments, the other faces (AS1, CS2) of the cube 3a which were exposed before the cube was manipulated by the user, are not modified by the manipulation of the cube 3a and return to their original displays and configurations, meaning as they were before manipulation of the cube 3a. This functionality of the programming station 1 may for example use the controller and memory, integrated into the support 2 of the station 1, by configuring the station 1 to store the displays and configurations of the cubes 3 positioned on the support 2 so that the configurations of the faces not concerned by the manipulation of a cube 3a can be found and applied when this cube 3a is repositioned on the support 2.

The detection module 2b then identifies the cube 3a whose orientation on the support 2 has been modified by the user, as well as its new orientation on the support 2. The module 2c transmits to the platform 101, via the communication network 100, data which represent the identification of the cube 3a whose orientation has been modified, and its new orientation. From these data, the platform 101 deduces which of its faces is newly exposed, and from the programming instruction element assigned to this face (face AA0 in FIG. 3a), constructs the programming instruction which is newly in force. It stores this then, upon detecting the fulfillment of the condition for activating this programming instruction (for the example illustrated in FIG. 3a, the reception of data, from the management platform(s) for the brightness sensor(s) for a given geographical area, indicating that the brightness has fallen below a certain threshold), it instructs the platform(s) of each device concerned by the programming instruction (for the example illustrated in FIG. 3a, the control platform(s) for one or more blinds installed in the geographical area) to activate this (these) device(s) in accordance with the programming instruction (for the example illustrated in FIG. 3a, lowering the blind(s) installed within the geographical area).

In one or more embodiments, the programming station 1 and the management platform 101 may be configured so that the modification of a first programming instruction element, for example by a user, leads to modifying a second programming instruction element according to the modification, based on the modification of the first programming instruction element, so as to ensure consistency between the first and second programming instruction elements as modified.

Figure 3A:
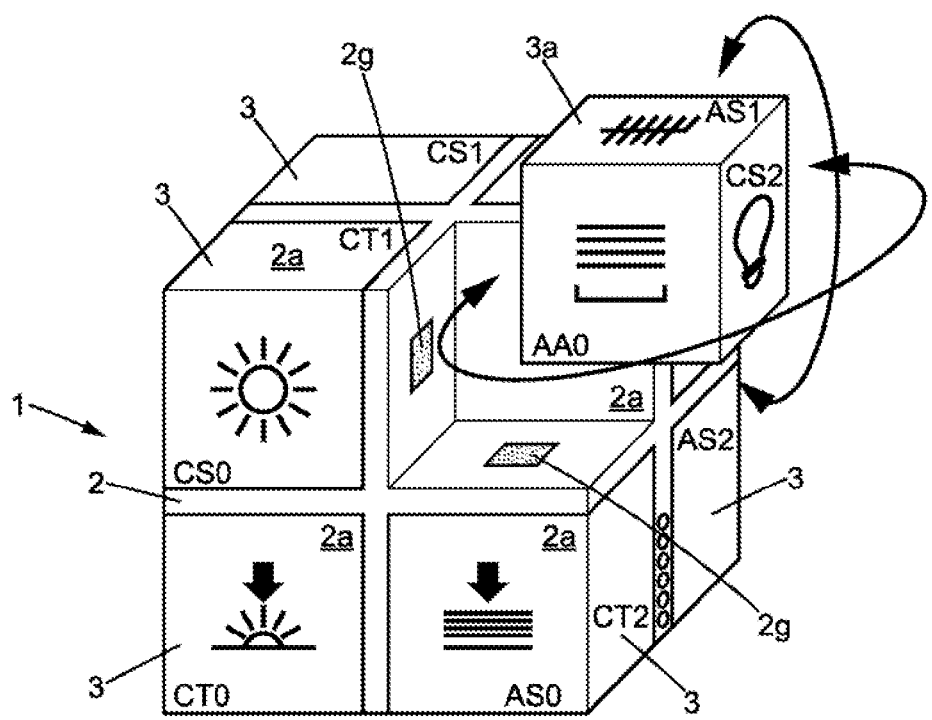
FIG. 3a shows the station of FIG. 2a when one of the blocks has been removed, in one or more embodiments.

For example, if the modification to the first programming instruction element concerns an instruction element relating to the programming theme (exposed faces CS0 or CT0 on the station 1 as illustrated in FIG. 3a), this modification may cause a modification of a second programming instruction element, also relating to the programming theme (respectively the exposed faces CT0 or CS0 on the station 1 as illustrated in FIG. 3a). Similarly, if the modification of the first programming instruction element concerns an instruction element relating to a programming condition (exposed faces CS0 or CT0 on the station 1 as illustrated in FIG. 3a), this modification may cause a modification of a second programming instruction element, also relating to the condition (respectively the exposed faces CT0 or CS0 on the station 1 illustrated in FIG. 3a). Finally, if the modification of the first programming instruction element concerns a programming instruction element relating to a programming action (exposed faces AA0 or AS0 on the station 1 as illustrated in FIG. 3a), this modification may cause a modification of a second programming instruction element, also relating to the programming action (respectively the exposed face AS0 or AA0 on the station 1 illustrated in FIG. 3a).

With reference to FIG. 1, data relating to the first programming instruction element as modified may be transmitted by the programming station 1 to the management platform 101, as described above. Upon detecting the modification of the first programming instruction element, the management platform 101 may be configured to analyze the programming instruction, in other words the combination of programming instruction elements to which the first modified programming instruction element belongs, and determine whether a modification of a second programming instruction element of the combination must be carried out, and where appropriate identify this modification. This analysis may be carried out as a function of the data relating to the programming instructions, and in particular to the programming instruction elements. For example, the programming instruction elements relating to a theme can be defined to include a theme identifier, so that a modification of the theme identifier in a first programming instruction element of a combination of instruction elements can lead to a modification of a second instruction element of the combination, according to this theme identifier. Likewise, the programming instruction elements relating to an object or a device can be defined to include an object or object type identifier, so that a modification of the object or object type identifier in a first programming instruction element of a combination of instruction elements can lead to a modification of a second programming instruction element of the combination, according to this object or object type identifier. Once the modification of the second programming instruction element has been determined, the management platform 101 can transmit, to the programming station 1, data relating to the second programming instruction element as modified. Upon receipt of this data, the programming station 1 can be configured to update the display on the face of the cube 3 concerned by this second modification, according to the data received.

Figure 3D:
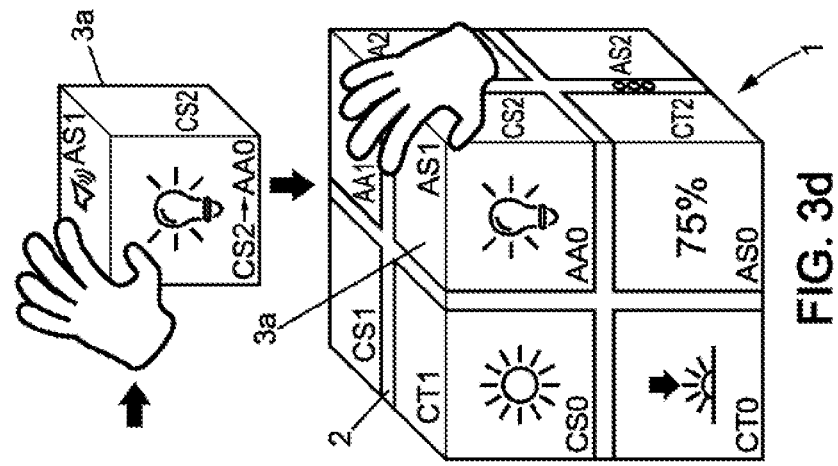
FIGS. 3b to 3d show the station of FIG. 3a when one of the blocks has been removed and then repositioned in order to modify a programming instruction element, in one or more embodiments.
Figure 3C:
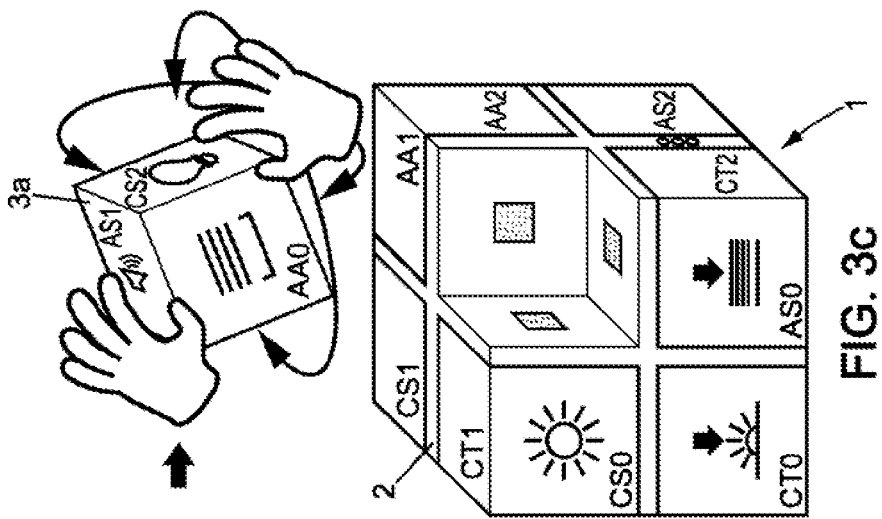
Figure 3B:
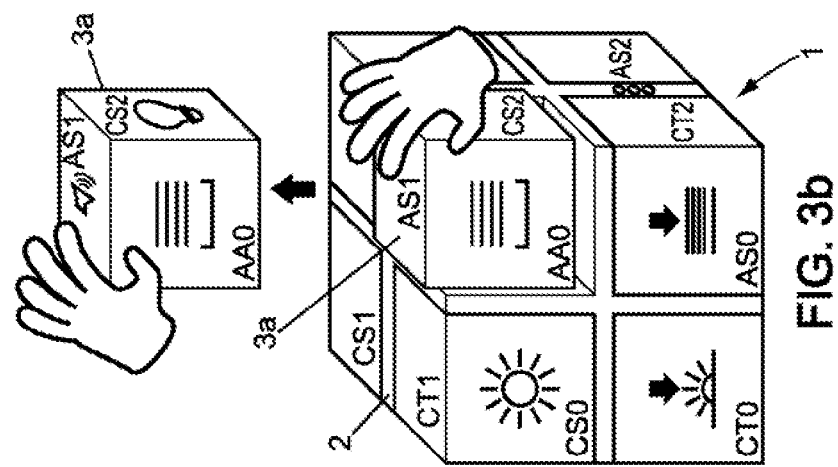

FIGS. 3b, 3c, 3d illustrate an exemplary modification of a second programming instruction element following the modification of a first programming instruction element made by a user on the station 1, as described above with reference to FIG. 3a, according to one or more embodiments:

- the user grasps the station 1 in his or her hands, with the eight cubes positioned on the support 2, and removes from the support 2 the cube 3a which corresponds to an element to be modified in the programming displayed on the faces CS0, CT0, AA0, AS0 of the cubes forming one side of the station 1 (FIG. 3b). This detachment of the cube 3a is detected by the cube 3a itself, and it displays on its faces (AS1 and CS2 in particular) the additional programming instruction elements that it has in memory (sound reproduction device displayed on face AS1 of the cube 3a, and lighting device displayed on face CS2 of the cube 3a);
- the user then turns the removed cube 3a in order to determine which of the faces of the cube displays the programming instruction element the user wishes to adopt. This manipulation of the cube 3a is illustrated in FIG. 3c; and
- the user repositions the cube 3a on the support 2 while exposing the face which displays the adopted programming instruction element on the side of the station 1 identified as being the side concerned by the modification (FIG. 3d). In the example illustrated, the user chooses to modify the programming instruction element which corresponds to face AA0 of the cube 3a, initially displaying a shutter or blind type of device, replacing it with the programming instruction element which corresponds to face CS2 of the cube 3a, displaying a lighting device after detachment of the cube 3a. Face AA0 is thus modified to correspond to a programming instruction element which before the modification corresponded to face CS2;
- upon repositioning the cube 3a on the support 2, data relating to the programming instruction element corresponding to face AA0 are transmitted to the management platform 101 of FIG. 1. The management platform 101 detects a modification of the programming instruction element corresponding to face AA0 of the station 1, then analyzes the combination of programming instruction elements corresponding to the side of the programming station 1 which is concerned by the modification (brightness theme (on face CS0), brightness decrease condition (on face CT0), lighting device to be actuated (on face AA0), and action corresponding to closing a shutter or blind (on face AS0)). The management platform detects an incompatibility or, depending on the embodiment, an absence or a lack of correspondence between two programming instruction elements in this combination, in the current illustrated example this being between the device to be actuated and the action to be performed on this device, or, depending on the embodiments, between the type of device to be actuated and the type of action to be performed. As described above, this detection may for example use the detection of a difference in identifiers respectively associated with the type of device to be actuated and with the type of action to be performed. Upon detecting this lack of correspondence, the management platform may be configured to determine a programming instruction element modification which enables correcting the lack of a detected correspondence. Preferably, the management platform will be configured to choose a programming instruction element modification which does not impact the programming instruction element for which it has received data (in the example illustrated in FIGS. 3b, 3c, and 3d: the programming instruction element corresponding to face AA0). In the example illustrated in FIG. 3d, a modification of the programming instruction element corresponding to face AS0 is determined, to replace the action of closing a shutter or blind with an action of setting the light to a level that is 75% of the maximum light level of the actuated device. Data relating to the programming instruction element so modified are transmitted to the programming station 1, which in return displays the modified programming instruction element on face AS0 of the station 1.

Figure 3G:
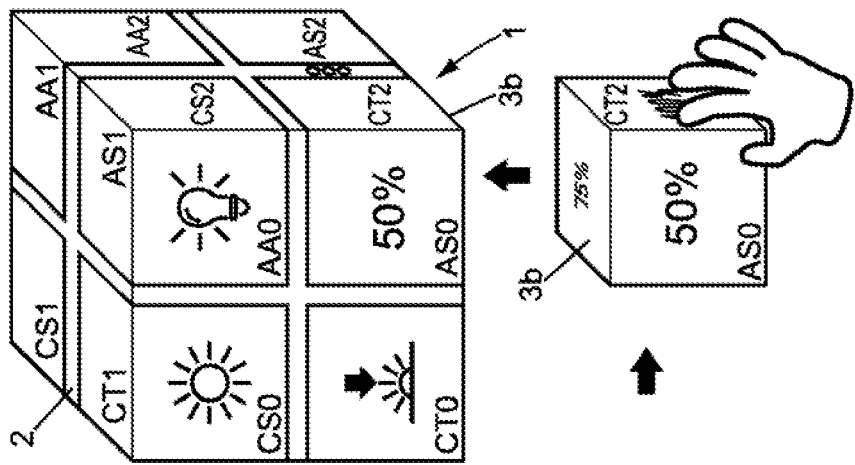
FIGS. 3e to 3g show the station of FIG. 3d when one of the blocks has been removed and then repositioned in order to modify a programming instruction element, in one or more embodiments.
Figure 3F:
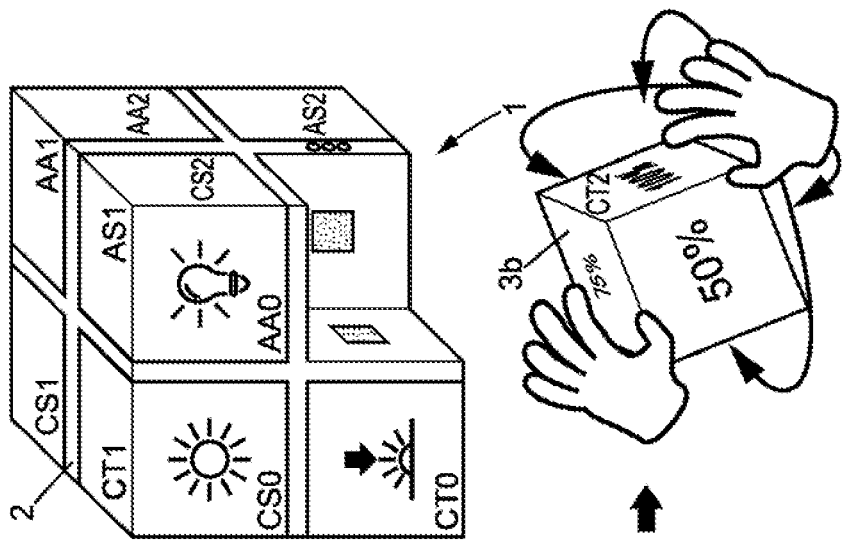
Figure 3E:
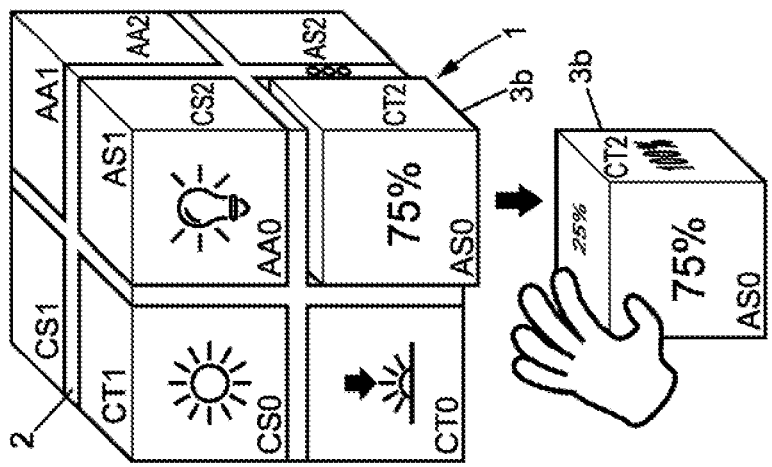

FIGS. 3e, 3f, and 3g illustrate a modification by the user of a programming instruction element on the station of FIG. 3d, which does not result in the modification of another modified programming instruction element, according to one or more embodiments:

- the user grasps the station 1 in his or her hands, with the eight cubes positioned on the support 2, and removes from the support 2 the cube 3b which corresponds to an element to be modified in the programming displayed on faces CS0, CT0, AA0, AS0 of the cubes forming one side of the station 1 (FIG. 3e). This detachment of the cube 3b is detected by the cube 3b itself, and it displays on its faces (notably CT2) the additional programming instruction elements that it has in memory (light level at 25% on the upper face, light level at 100% on face CT2);
- the user then turns the removed cube 3b in order to determine which of the faces of the cube displays the programming instruction element the user wishes to adopt. This manipulation of the cube 3b is illustrated in FIG. 3f;
- the user repositions the cube 3b on the support 2 while exposing the face which displays the adopted programming instruction element on the side of the station 1 identified as being the side concerned by the modification (FIG. 3g). In the example illustrated, the user chooses to modify the programming instruction element corresponding to a light level of 75% by replacing it with a programming instruction element corresponding to a light level of 50%; and
- upon repositioning the cube 3b on the support 2, data relating to the programming instruction element corresponding to face AS0 are transmitted to the management platform 101 of FIG. 1. The management platform detects a modification of the programming instruction element corresponding to face AS0 of the station, then analyzes the combination of programming instruction elements corresponding to the side of the programming station 1 which is concerned by the modification (brightness theme (on face CS0), brightness decrease condition (on face CT0), lighting device to be actuated (on face AA0), and action to activate lighting at a given level (on face AS0). The management platform does not detect any incompatibility, absence, or lack of correspondence between two programming instruction elements in this combination, and in particular between the device to be actuated and the action to be performed on this device or, depending on the embodiments, between the type of device to be actuated and the type of action to be performed. In this case (non-detection of an incompatibility, absence, or lack of correspondence, depending on the embodiments), the management platform may be configured so that it does not determine any modification to the programming instruction, and therefore not to transmit, to the programming station 1, data relating to a programming instruction to be modified. The programming station therefore displays on face AS0, following the repositioning of the cube 3b on the support 2, the programming instruction element (50%) as modified by the user.

In one or more embodiments, to further facilitate the use of the station 1, some of the cubes 3 may be assigned to the selection of programming instruction elements which always specify activation conditions, as introduced above and including the condition parameters and the conditions. At the same time, other cubes 3 may be assigned to the selection of programming instruction elements which always specify device operations. The cubes of these two categories can then be differentiated, for example by different colors, shapes, dimensions, or materials. In the non-limiting case in which two colors are used to differentiate cube categories, these colors advantageously indicate to the user who has removed one of the cubes 3 from the support 2 that he or she is in the process of selecting an activation condition or a device operation. Thus, in FIGS. 2 and 3, the two cubes 3 which appear on the front of the station 1 in its left part may for example be of a first color, and the other two cubes 3 which also appear on the front of the station 1 but in its right part may for example be of a second color different from the first color.

In one or more embodiments, each face of a cube may be assigned to the selection of a programming instruction element which is either always of the activation condition type, or always of the device operation type, the type of the instruction element being able to vary between different faces of the same cube. In this case, the faces may be of different colors, whether or not they belong to the same cube.

In other embodiments which are also possible, the cubes or the cube faces may each be assigned to only one of the four types of programming instruction elements listed above. Such an assignment can then be indicated to the user by any differentiating characteristic(s), for example four different colors for the cubes or cube faces.

Such implementations with differentiating characteristics, such as differentiated colors, further increase the intuitive nature of the use of the station 1.

In one or more embodiments, the support 2 of the station 1 may be provided with selectors, for example based on touch sensors, and visual indicators, to allow the user to modify operating parameters of the station 1 or to visualize its operating state or configuration. The parameters adjustable in this manner may concern, as non-limiting examples, the activation of a loudspeaker of the station 1, an adjustment of its volume, the activation of a microphone of the station 1, the selection of a language, the selection and/or configuration of a connection mode of the station 1 to the communication network 100, for example to configure a WiFi® connection mode, etc. The visual indicators may concern these parameter adjustments, indicate a residual charge level in the battery of the station 1, a quality of transmission between the station 1 and the communication network 100, etc. Such selectors and visual indicators are indicated as a whole by the reference 2f in the example illustrated in FIG. 2a.

In one or more embodiments, adjustment of the parameters of the station 1 may be carried out by means of the cubes 3, in a similar manner to the programming mode which has been described for devices external to the station 1. For example, one of the devices displayed on a face of one of the cubes 3 may be replaced by an icon of the station 1 itself, and the operating or configuration options of the station 1 which can be modified by the user may be displayed on the faces of another cube 3.

Figure 4:
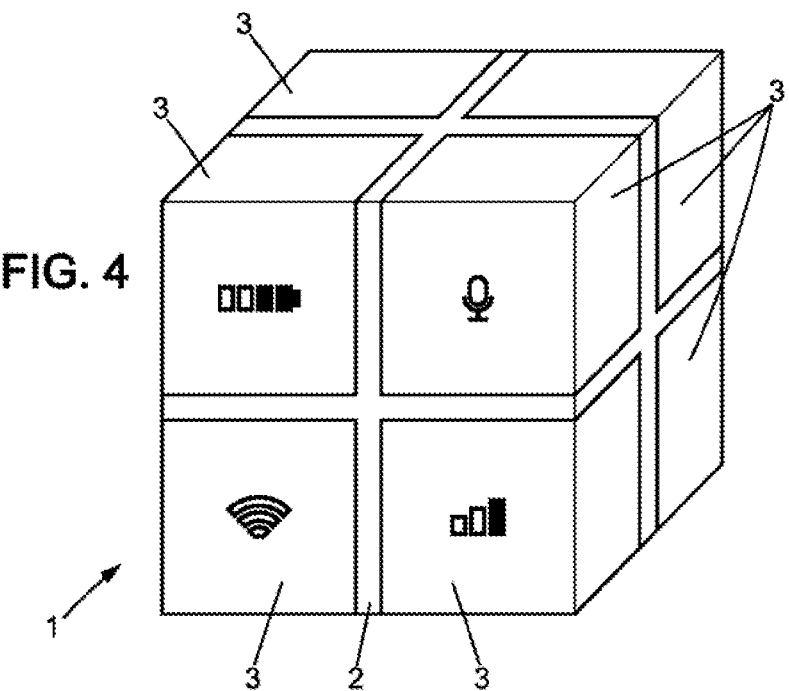
FIG. 4 corresponds to FIG. 2a for another embodiment.

In some embodiments which are also possible, visual indicators which relate to the operation and configuration of the station 1 may be replaced by displays on some of the faces of the cubes 3, in place of the programming instruction elements which relate to devices external to the station 1. FIG. 4 shows an example of such an embodiment, in which the front exposed faces of cubes 3 indicate the residual charge level of the battery 2d, a reception operation in effect via wireless connection, an activation state in effect for the microphone of the station 1, and a current volume level in effect for its loudspeaker. Possibly, certain cubes 3 or certain faces of cubes 3 may be dedicated to the operation and configuration of the station 1. In this case, they may be differentiated by a differentiating characteristic, such as a particular color, size, shape, and/or material, in comparison to the other cubes 3 or faces of cubes 3 which are dedicated to programming devices external to the station 1.

Although the proposed programming station has been described above for a geometric configuration with eight cubes 3 held on the support 2 in the three-dimensional arrangement of 2 cubes×2 cubes×2 cubes, the skilled person will understand that multiple other geometrical configurations are possible for the station 1. Such other configurations can facilitate user manipulations of the station 1, or encourage even more intuitive uses.

Figure 5:
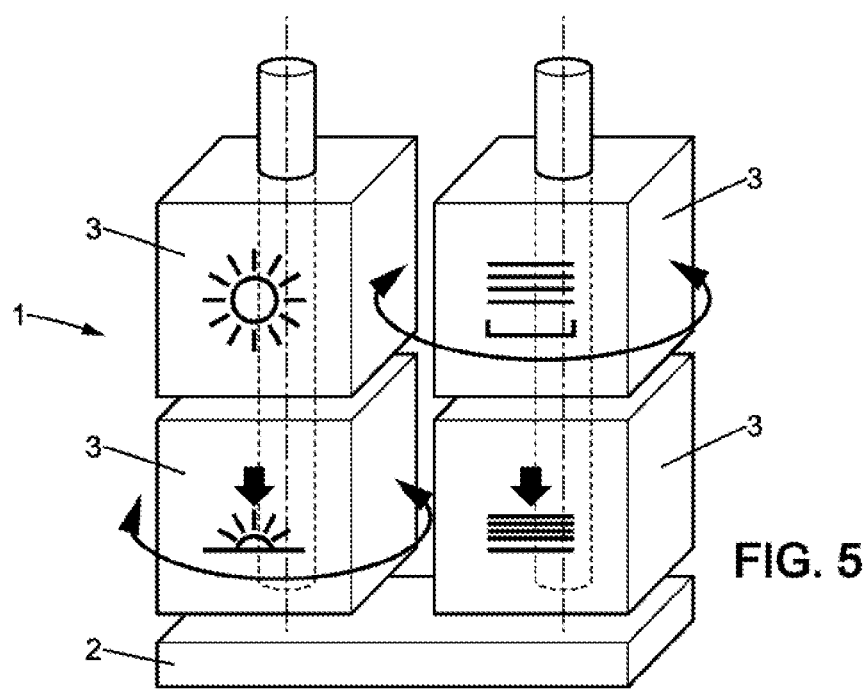
FIGS. 5 and 6 correspond to FIGS. 2a and 3a for alternative configurations of universal programming stations with orientable blocks, according to one or more embodiments.

FIG. 5 shows another possible configuration, in which the cubes 3 are stacked in columns and can be oriented about a vertical axis of each column, the support 2 then comprising a base having an upper face forming a surface, for example substantially planar, on which are mounted one or more shafts not coplanar with the upper face, for example perpendicular to this face as illustrated in FIG. 5. Alternatively, in yet another possible configuration, the cubes 3 may be placed side by side horizontally in superimposed rows, and can be oriented about a horizontal axis of each row, similarly to an abacus.

Figure 6:
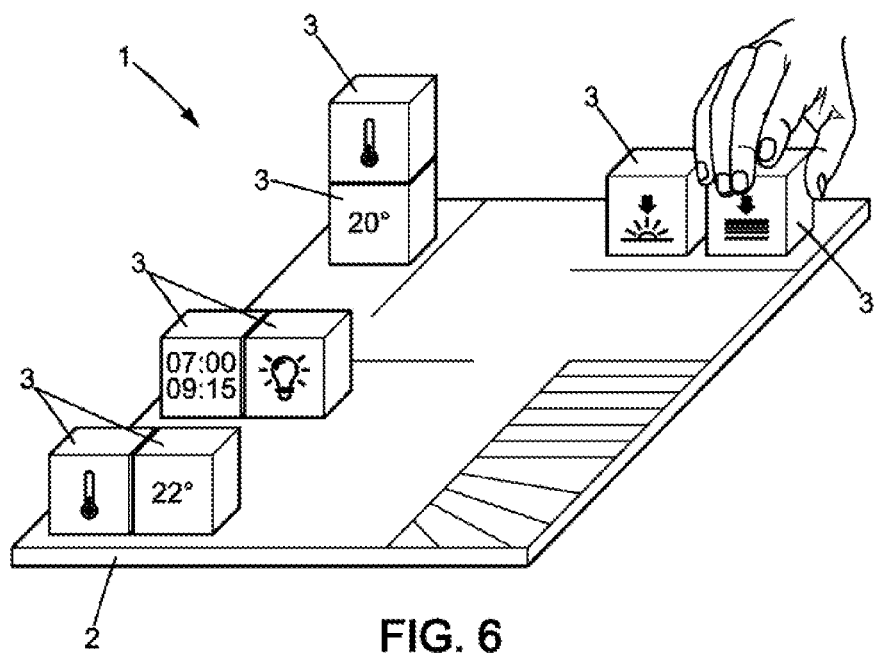

FIG. 6 shows another possible configuration, in which the support 2, in the non-limiting example illustrated in the figure having a face forming a substantially planar surface, constitutes a representation of the spatial distribution of several devices within a geographical area ZG. The blocks 3 (in this example having a cubic shape) which are used for programming one of the devices, configured according to one of the embodiments described above, may be positioned on the support 2 at locations which correspond to the location of the device within the geographical area ZG. In this manner, the user can more easily represent the device(s) for which the user is currently programming the operation.

More specifically, the exemplary embodiment illustrated in FIG. 6 shows two cubes 3 placed next to one another with two coplanar faces, one of them displaying an icon designating the temperature theme and the other displaying a temperature setpoint (22° C.). These two cubes make it possible to define a temperature setpoint in the corresponding room on the map of the geographical area, at the location of these two cubes on the support 2.

Two other cubes 3 are placed next to one another at another location of the support 2, with two coplanar faces, one of them displaying an icon designating the light theme and the other displaying a time interval setpoint (from 7:00 a.m. to 9:15 a.m.). These two cubes make it possible to define programming for turning on the light in the room which on the map of the geographical area corresponds to the location of these two cubes on the support 2, during the programmed time interval, i.e. from 7:00 a.m. to 9:15 a.m. in the example illustrated.

Two other cubes 3 are placed one atop the other at yet another location of the support 2, with two coplanar faces, one of them displaying an icon designating the temperature theme and the other displaying a temperature setpoint (20° C.). As in the above example, but with two cubes placed one atop the other instead of being placed next to one another, and for a device which is located at another location in the geographical area for which the support 2 represents a map, the two cubes make it possible to define a temperature setpoint at a location in the geographical area which corresponds to the location of these two cubes on the support 2.

Finally, two other cubes 3 are placed next to one another at yet another location of the support 2, with two coplanar faces, one of them displaying an icon designating a brightness condition, and the other displaying an action relating to a blind or shutter type of device. These two cubes make it possible to define programming for closing the blinds or shutters when the brightness decreases in the room which corresponds, on the map of the geographical area, to the location of these two cubes on the support 2.

These four examples show sets of two cubes arranged on the support so as to have two coplanar faces, each of the two coplanar faces being equipped with a display in order to display a programming instruction element of a device which is located, on the map of the geographical area, at a location (for example considered at a room-level scale) corresponding to the location of the two cubes on the support, and the combination of the programming instruction elements displayed on the coplanar faces forming a programming instruction for the operation of the device.

Those skilled in the art will further understand that the proposed systems, programming stations, platform(s), and methods can be implemented in different embodiments by modifying certain aspects compared to the embodiments described in detail above. In particular, the following aspects may be changed:

the shape of the orientable blocks may be different from a cube shape;
the arrangement and mode for holding the blocks on the support may be any arrangement and mode;
the modes of communication between the programming station with orientable blocks and the management platform for managing it may be any modes;
the distribution of functions between the programming station with orientable blocks and the management platform for managing it, in particular with regard to the functions of storage, configuration of the faces of the blocks, contextual selection of programming instructions or programming instruction elements, etc., can be modified; and
the distribution of functions between the support of the programming station with orientable blocks and the blocks, in particular with regard to the functions of storage, motion detection, detection of the repositioning of a block on the support, detection of the orientation of each block, configuration of the faces of a block, etc., can also be modified.

The proposed systems, programming stations, platform(s), user devices, and methods can be implemented using software and/or hardware components. In this perspective, the terms "module" and "unit" can correspond in this document to a software component, or to a hardware component, or to a set of hardware and/or software components, able to implement a function or a set of functions according to what is described for the module or unit concerned.

A software component corresponds to one or more computer program(s) executable by a processor, one or more subroutine(s) of a program, or more generally to any element of a program or of software. Such a software component is stored in memory then loaded and executed by a data processor of a physical entity (multimedia gateway, user device, terminal, etc.) and is capable of accessing the hardware resources of this physical entity (memories, storage media, communication bus, input/output circuit boards, user interfaces, etc.).

Similarly, a hardware component corresponds to any element of a hardware assembly. This may be a hardware component that is programmable or has an integrated processor for executing software, for example an integrated circuit (such as an application-specific integrated circuit (ASIC), a system on chip (SOC), a smart card, a circuit board for executing firmware, etc.

SOCs are embedded systems that integrate all the components of an electronic system into a single chip. An ASIC is a specialized electronic circuit which groups functionalities tailored for a given application. ASICs are generally configured during manufacture and can only be simulated by the user.

A method as proposed may also use hybrid architectures, for example such as architectures based on a CPU+FPGA, a GPU ("Graphics Processing Unit"), or an MPPA ("Multi-Purpose Processor Array").

The proposed systems, programming stations, platform(s), user devices, and methods may also be implemented using one or more combination(s) of software and hardware elements, for example such as a software program intended to be loaded and executed on a programmable logic circuit type of component (FPGA, for "Field Programmable Gate Array"). FPGAs are user-reconfigurable electronic circuits.

Depending on the embodiment chosen, certain acts, actions, events, or functions of each of the methods described in this document may take place or occur in a different order from that in which they have been described, or may be added, merged, or not take place or not occur, as the case may be. In addition, in certain embodiments, certain acts, actions, or events take place or occur concurrently and not successively.

Although described by means of a certain number of detailed exemplary embodiments, the proposed systems, programming stations, platform(s), user devices, and methods include different variants, modifications, and improvements which will be obvious to those skilled in the art, it being understood that these different variants, modifications, and improvements are within the scope of the invention as defined by the claims which follow. In addition, different aspects and characteristics described above may be implemented together, or separately, or substituted for one another, and all of the different combinations and sub-combinations of the aspects and characteristics are within the scope of the invention. In addition, some systems and devices described above may not incorporate all of the modules and functions described for the preferred embodiments.

The invention claimed is:

1. A universal programming station comprising:
orientable blocks for programming operations of at least one device, wherein respective orientations of several blocks on a support of the station correspond, by a configuration of said several blocks and of the support, to at least one programming instruction to program an operation of the device;
a detection module configured to detect the respective orientations of the blocks carried by the support; and
a communication module configured to send to a management platform, by using a communication network, data representing the at least one programming instruction corresponding to the blocks and to their respective orientations on the support.

2. The universal programming station of claim 1, further configured to, following a repositioning on the support of at least one block whose orientation has been modified by a user, identify the modified orientation of the at least one block as resulting from the repositioning, and send to the management platform new data which represent at least one new programming instruction resulting from said modified orientation of the at least one block.

3. The universal programming station of claim 1, wherein at least one of the blocks is detachable and repositionable on the support with several distinct orientations, for exposing respective faces of several of the blocks next to each other on the support, in order to compose a combination of the exposed faces of said several blocks which corresponds to the programming instruction.

4. The universal programming station of claim 3, wherein at least one of the blocks has several faces which are equipped with respective displays.

5. The universal programming station of claim 4, wherein the communication module is configured to receive, from the management platform by using the communication network, programming instructions which are available or programming instruction elements which are available for displaying on the faces equipped with displays.

6. The universal programming station of claim 4, wherein the communication module is configured to receive, from the management platform by the communication network, programming instruction elements which are available to be displayed on the faces equipped with displays, at least some of said programming instruction elements each specifying at least part of an activation condition, or each at least partly specifying an operation of a device,
and wherein programming instructions which are accessible to the user by using the station are each composed of an activation condition which is combined with an operation of a device.

7. The universal programming station of claim 6, wherein some of the programming instruction elements which specify part of an activation condition, each specify a condition parameter or a condition intended to relate to a condition parameter,
and some of the programming instruction elements which partly specify a device operation, each specify a device to be activated or a device operation to be activated if the activation condition is fulfilled.

8. The universal programming station claim 1, wherein the support is designed to correspond to a spatial distribution of at least one device within a geographical area, and is configured to hold each block which relates to the programming of said device at a location on the support which corresponds to a location of the device within the geographical area.

9. A method for programming operations of at least one device, the method comprising:
providing a universal programming station that has orientable blocks for programming the operations of said at least one device, wherein respective orientations of several blocks on a support of the station correspond, by a configuration of said several blocks and of the support, to at least one programming instruction to program an operation of the device, and wherein the station is provided with a detection module configured to detect the respective orientations of the blocks carried by the support, and is provided with a communication module configured to send to a management platform, by using a communication network, data representing the at least one programming instruction corresponding to the blocks and to their respective orientations on the support, and wherein providing the universal programming station further comprises connecting the station to the management platform by using the communication network;
by the management platform: configuring the blocks and the support by assigning programming instructions or programming instruction elements to the orientations of the blocks on the support;
by the station: detecting current orientations of the blocks carried by the support, then sending to the management platform, by using the communication network, data which identify said current orientations of the blocks;
by a user: modifying an orientation of at least one of the blocks carried by the support, in order to form a new current orientation of the at least one block;
by the station: repeating the detecting for the new current orientation of the at least one block whose orientation has been modified; and
by the management platform: determining at least one programming instruction which corresponds to the current orientations of the blocks on the support, as identified by the data received, then in collaboration with another platform relating to the device, controlling an operation of said device which is in accordance with the determined programming instruction.

10. The method of claim 9, wherein at least one of the blocks has several faces which are equipped with respective displays, and the method further comprises:
by the management platform: transmitting to the station, by using the communication network, the programming instructions or programming instruction elements assigned to those of the faces equipped with displays which are exposed on the support; and
by the station: for the blocks carried by the support, displaying, on the exposed faces equipped with displays of said blocks, the programming instructions or programming instruction elements assigned to said exposed faces equipped with displays.

11. The method of claim 10, further comprising, in response to one of the blocks being removed from the support:
> by the station: displaying, on several of the faces of the removed block which are equipped with displays, programming instructions or programming instruction elements available for alternative selection by the user by modifying the orientation of the block and repositioning said block on the support.

* * * * *